United States Patent
Hara et al.

(10) Patent No.: US 11,500,260 B2
(45) Date of Patent: Nov. 15, 2022

(54) METHOD FOR MANUFACTURING LIQUID DROP CONTROL DEVICE, LIQUID DROP CONTROL DEVICE, AND DISPLAY DEVICE

(71) Applicant: SHARP KABUSHIKI KAISHA, Sakai (JP)

(72) Inventors: Takeshi Hara, Sakai (JP); Tomoko Teranishi, Sakai (JP); Akihiko Shibata, Yonago (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 287 days.

(21) Appl. No.: 16/620,469

(22) PCT Filed: Jun. 5, 2018

(86) PCT No.: PCT/JP2018/021515
§ 371 (c)(1),
(2) Date: Dec. 6, 2019

(87) PCT Pub. No.: WO2018/225713
PCT Pub. Date: Dec. 13, 2018

(65) Prior Publication Data
US 2021/0088869 A1    Mar. 25, 2021

(30) Foreign Application Priority Data
Jun. 7, 2017 (JP) .............................. JP2017-112446

(51) Int. Cl.
*G02F 1/1679* (2019.01)
*G02B 26/00* (2006.01)
(Continued)

(52) U.S. Cl.
CPC ......... *G02F 1/1679* (2019.01); *G02B 26/005* (2013.01); *G02F 1/1303* (2013.01); *G02F 1/167* (2013.01); *G02B 2207/115* (2013.01)

(58) Field of Classification Search
CPC ...... G02F 1/1303; G02F 1/1335; G02F 1/136; G02F 1/136286; G02F 1/167; G02F 1/1679; G02F 1/133526; G02F 1/1341; G02F 1/13415; G02F 1/1345; G02F 1/13629; G02F 1/136295; G02F 1/1368; H01L 51/56; H01L 27/3246; H01L 51/0005; H01L 27/3244; H01L 21/288; H01L 27/1292; H01L 51/0004; H01L 51/0022; H01L 21/76838; H01L 27/12;
(Continued)

(56) References Cited

U.S. PATENT DOCUMENTS

| 2005/0200273 | A1* | 9/2005 | Nozawa | H01L 51/5221 313/503 |
| 2012/0015522 | A1* | 1/2012 | Arita | H01L 21/6835 438/703 |
| 2015/0303393 | A1* | 10/2015 | Dai | H01L 27/3246 257/40 |

FOREIGN PATENT DOCUMENTS

JP    2012-068506 A    4/2012

* cited by examiner

*Primary Examiner* — Brandi N Thomas
(74) *Attorney, Agent, or Firm* — ScienBiziP, P.C.

(57) ABSTRACT

The present invention has as an object to, by controlling how oil injected into a liquid drop control device wet spreads, make it harder for bubbles to remain in a cell. A liquid drop control device of the present invention is characterized in that in at least one substrate, there is a gap between an end face of a lyophobic layer and a seal material and the lyophobic layer and the seal material make contact with each other in at least one place.

23 Claims, 12 Drawing Sheets

(51) Int. Cl.
*G02F 1/13* (2006.01)
*G02F 1/167* (2019.01)

(58) Field of Classification Search
CPC ........... H01L 27/3211; H01L 29/78669; H01L 51/0007; H01L 21/02126; H01L 21/02263; H01L 21/02282; H01L 21/02307; H01L 21/0231; H01L 21/3121; H01L 21/46; H01L 21/4867; H01L 21/76877; H01L 21/76885; H01L 2224/27334; H01L 2224/2929; H01L 2224/293; H01L 2224/83851; H01L 2227/323; H01L 2227/326; H01L 2251/5315; H01L 2251/558; H01L 27/1214; H01L 27/14621; H01L 27/14685; H01L 27/3281; H01L 27/3283; H01L 29/41733; H01L 29/66765; H01L 2924/1461; H01L 31/02162; H01L 51/0002; H01L 51/0003; H01L 51/0008; H01L 51/0017; H01L 51/0019; H01L 51/0024; H01L 51/0036; H01L 51/0038; H01L 51/0039; H01L 51/0043; H01L 51/0059; H01L 51/5012; H01L 51/5234

See application file for complete search history.

METHOD FOR MANUFACTURING LIQUID DROP CONTROL DEVICE, LIQUID DROP CONTROL DEVICE, AND DISPLAY DEVICE

TECHNICAL FIELD

The present invention relates to a liquid drop control device.

BACKGROUND ART

PTL 1 discloses an electrowetting display in which a cell having an opening is formed by applying a seal material to a first substrate to form a seal pattern shaped like a frame, bonding the first substrate to a second substrate, and curing the seal material. Through the opening, emulsion ink containing a lyophilic liquid and a lyophobic liquid dispersed in the lyophilic liquid is injected into the cell.

CITATION LIST

Patent Literature

PTL 1: Japanese Unexamined Patent Application Publication No. 2012-68506 (published on Apr. 5, 2012)

SUMMARY OF INVENTION

Technical Problem

In a case where a displacement in alignment of the seal material occurs during the formation of the seal material, a gap is formed between the seal material and a lyophobic liquid region, with the result that, oil may not appropriately wet spread as intended by a designer. The inventors found that it is possible to, by appropriately forming a lyophilic region and a lyophobic region on top of a substrate to control how injected oil wet spreads, make it harder for bubbles to remain in a cell.

Solution to Problem

In order to solve the foregoing problems, a method for manufacturing a liquid drop control device of the present invention includes: a substrate manufacturing step of manufacturing two substrates each including a lyophobic layer; and a bonding step of applying a seal material at a gap from an end face of the lyophobic layer of a first one of the substrates, bonding a second one of the substrate and the seal material together so that the lyophobic layers face each other, and sealing a space between the two substrates. In at least one of the substrates, the end face of the lyophobic layer and the seal material make contact with each other in at least one place.

Further, a liquid drop control device of the present invention is a liquid drop control device including: two substrates whose respective lyophobic layers face each other; and a seal material sealing a space between the two substrates, wherein in at least, one of the substrates, the end face of the lyophobic layer and the seal material make contact with each other in at least one place.

Advantageous Effects of Invention

The present invention makes it possible to provide a liquid drop control device having a structure in which bubbles in a cell that inhibit the behavior of a reagent are hardly produced during injection of oil.

DESCRIPTION OF EMBODIMENTS

Embodiment 1

An embodiment of the present invention is described in detail below. For convenience of explanation, members having the same functions as those described in each embodiment are given the same signs, and a description of such members is omitted. The term "lyophilic" herein refers to having such a property that an angle of contact with a liquid is 90 degrees or smaller. Further, the term "lyophobic" herein refers to having such property that an angle of contact with a liquid exceeds 90 degrees.

Figure 2:
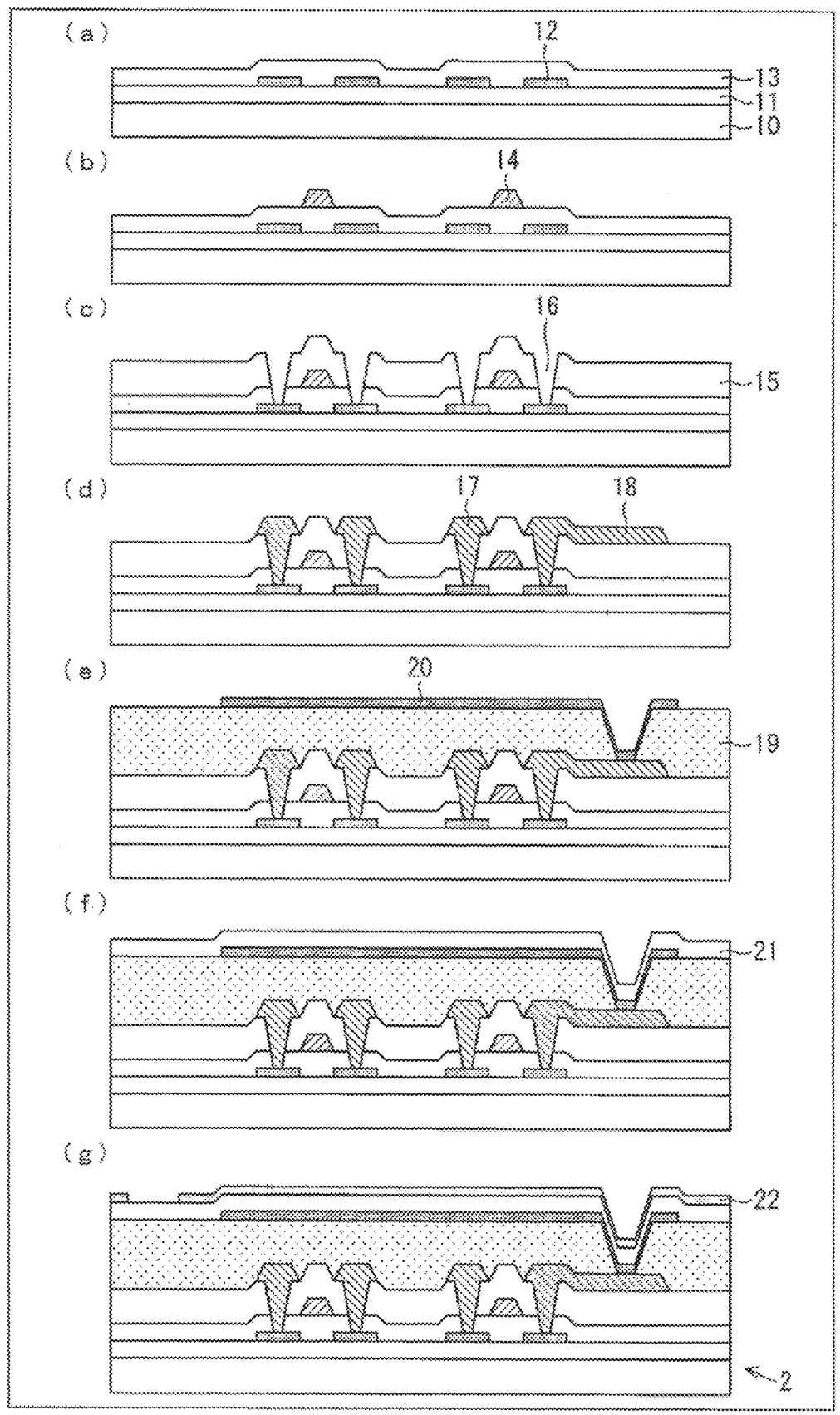
FIG. 2 illustrates step cross-sectional views explaining about a method for manufacturing a control substrate of the liquid drop control device according to Embodiment 1 of the present invention.
Figure 3:
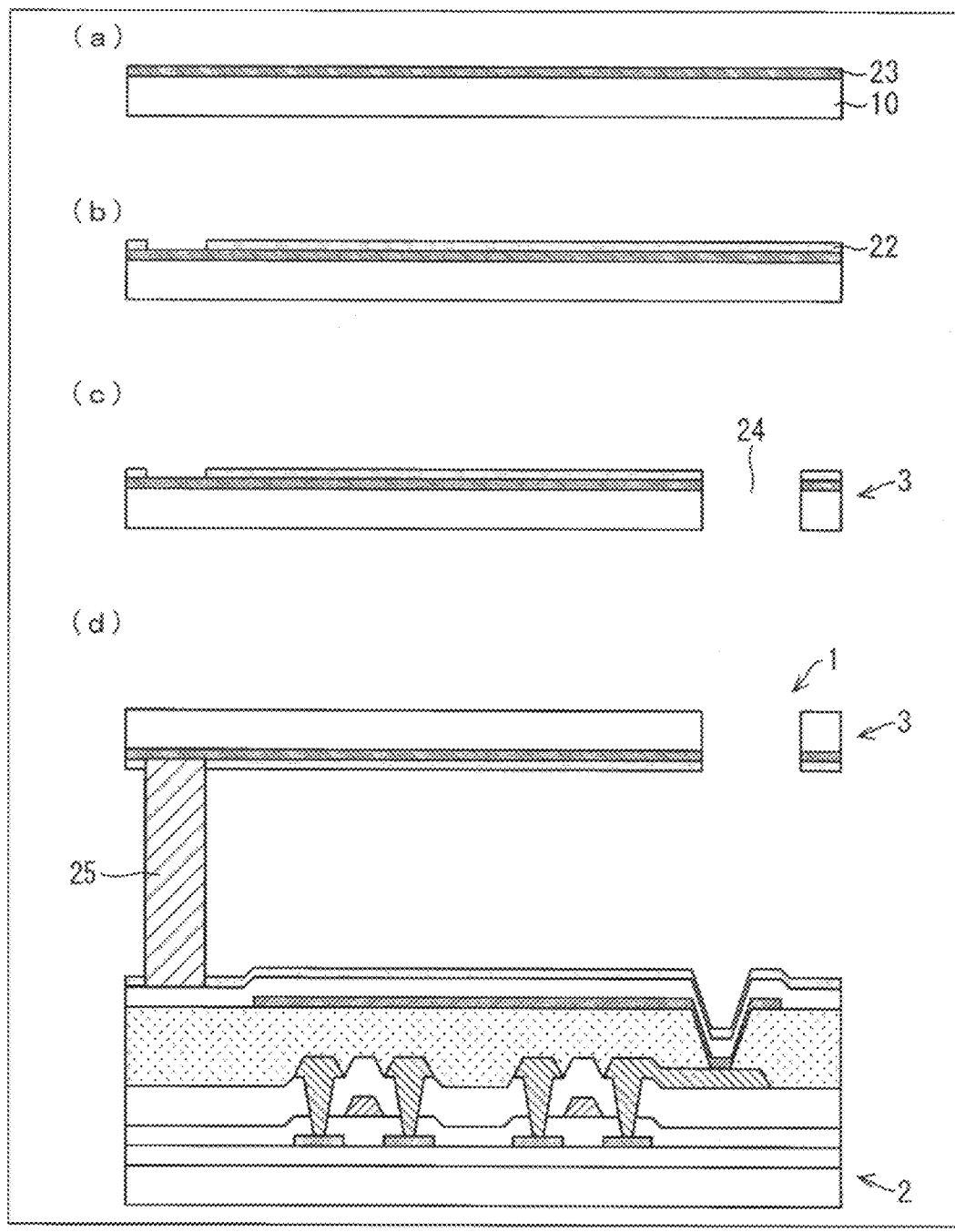
FIG. 3 illustrates step cross-sectional views explaining about a method for manufacturing a counter substrate of the liquid drop control device according to Embodiment 1 the present, invention and a s sectional view of the liquid drop control device according to Embodiment 1 of the present invention.

FIGS. 2 and 3 illustrate diagrams showing a method for manufacturing a liquid drop control device 1 (electrowetting device) according to the present embodiment. FIG. 2 illustrates step cross-sectional views showing a method for manufacturing a control substrate 2 (active matrix substrate) of the liquid drop control device 1 in the order of (a) to (g). (a) to (c) of FIG. 3 are step cross-sectional views showing a method for manufacturing a counter substrate 3 of the liquid drop control device 1 in the order of (a) to (c). (d) of FIG. 3 is a cross-sectional view of the liquid drop control device 1 in which the control substrate 2 and the counter substrate 3 are bonded together.

The control substrate 2 of the liquid drop control device 1 according to the present embodiment includes a lyophobic layer on top of a TFT substrate including TFTs (thin-film transistors). The method for manufacturing the control substrate 2 is described with reference to FIG. 2.

First, as shown in (a) of FIG. 2, a buffer layer 11 is formed on top of a glass substrate 10. The buffer layer 11 thus formed may be a film of $SiN_x$, $SiO_2$, SiNO, or the like having a film thickness of approximately 100 to 300 nm. The buffer layer 11 is unnecessary in some devices. A semiconductor layer 12 is formed on top of the buffer layer 11. The semiconductor layer 12 is a Si film having a film thickness of approximately 20 to 100 nm and may be patterned by photo dry etching after having been formed and crystallized. The semiconductor layer 12 may for example be low-temperature polysilicon. Furthermore, a gate insulating layer 13 is formed on top of the buffer layer 11 and the semiconductor layer 12 as a film of $SiN_x$, $SiO_2$, or the like or a laminated film of $SiN_x/SiO_2$ with a film thickness of approximately 50 to 200 nm.

Then, as shown in (b) of FIG. 2, a gate electrode 14 is formed. The gate electrode 14 may be obtained by forming a film of a metal material such as W, Mo, or Al with a film thickness of 100 to 400 nm and then patterning the film by photo dry etching. For improvements in adhesiveness and contact resistance, a laminated structure of W/Ta, MoW, Ti/Al, Ti/Al/Ti, Al/Ti, or the like or an alloy material of these metals may be appropriately employed as the gate electrode 14.

Next, as shown in (c) of FIG. 2, $SiN_x$, $SiO_2$, SiNO, or a laminated structure thereof is formed as an interlayer insulating layer 15 with a film thickness of approximately 500 to 900 nm. After this, a contact hole 16 is formed on top of the semiconductor layer 12 by etching the interlayer insulating layer 15 and the gate insulating layer 13 by photo dry etching.

Then, a film of a metal material such as Al or Mo having a film thickness of 200 to 400 nm patterned by photo dry etching so that, as shown in (d) of FIG. 2, a source electrode 17 and a drain electrode 18 are formed on top of the interlayer insulating layer 15 and in the contact hole 16. For improvements in adhesiveness and contact resistance, a laminated structure of metal materials or an alloy material may be appropriately employed as the source electrode 17 and the drain electrode 18. As the metal materials, Ti Al, Ti/Al/Ti, Al/Ti, TiN/Al/TiN, Mo; Al, Mo/Al/Mo, Mo/AiNd/Mo, MoN/Al/MoN, or the like may be appropriately employed.

Next, as shown in (e) of FIG. 2, an interlayer insulating layer 19 is formed on top of the interlayer insulating layer 15, the source electrode 17, and the drain electrode 18. The interlayer insulating layer 19 may be obtained by forming and patterning a film of a photosensitive organic material by photolithography. On top of the interlayer insulating layer 19, an array electrode 20 a part of which makes contact with the drain electrode 18 is formed. The array electrode 20 may be obtained by forming a film of an electrode material such as ITO, IZO, or ZnO with a film thickness approximately 50 to 150 nm on top of the interlayer insulating layer 19 and patterning the film by photo wet etching. After having been patterned, the array electrode 20 may be subjected to an annealing process for a reduction in resistance of the array electrode 20.

Furthermore, as shown in (f) of FIG. 2, a protective insulating layer 21 (lyophilic layer) is formed on top of the interlayer insulating layer 19 and the array electrode 20. The protective insulating layer 21 is used to protect the lower layers of the control substrate 2 and to ensure insulation between a liquid drop reagent and the control substrate 2 during use of the liquid drop control device 1. The protective insulating layer 21 may be obtained by forming a film of $SiN_x$, $SiO_2$, SiNO, or a laminated structure thereof with a film thickness of approximately 100 to 400 nm. Further, although not illustrated in FIG. 2, the protective insulating layer 21 may be patterned by photo dry etching so as to be removed from a mounting terminal area of the control substrate 2.

Finally, as shown in (g) of FIG. 2, a lyophobic layer 22 is formed on top of the protective insulating layer 21. The lyophobic layer 22 may be obtained by forming a film of a lyophobic material with a thickness of approximately 30 to 100 nm by a film-forming method such as dip coating, slit coat, or a printing method and patterning the film by photo dry etching. The lyophobic layer 22 may also be patterned by using a lift-off method in which after a resist has been patterned by photolithography, the lyophobic material is formed into a film and a lyophobic layer is removed together with the resist. As the lyophobic material, lyophobic resin such as amorphous fluororesin may be employed.

Through the foregoing steps, the control substrate 2 is obtained. Although FIG. 2 illustrates a method for manufacturing a TFT circuit within an array element of the control substrate 2, peripheral circuits such as a gate driver and a source drive may be formed at the same time.

Next, the method for manufacturing the counter substrate 3 of the liquid drop control device 1 according to the present embodiment, the method for manufacturing the liquid drop control device 1, and a structure of the liquid drop control device 1 are described with reference to (a) to (d) of FIG. 3.

To begin with, the method for manufacturing the counter substrate 3 is described. First, as shown in (a) of FIG. 3, a counter electrode 23 (lyophilic layer) is formed on top of a glass substrate 10. The counter electrode 23 may be obtained by forming a film of an electrode material such as ITO, IZO, or ZnO with a film thickness of approximately 50 to 150 nm. At this point in time, although not illustrated in FIG. 3, an alignment marker for use in a process in a subsequent step may be formed by patterning the counter electrode 23 by photo wet etching. Further, for a reduction in incidence of conduction defects between the control substrate 2 and the counter substrate 3, electrode materials in positions of division between the respective substrates may be removed at the same time.

Next, as shown in (b) of FIG. 3, a lyophobic layer 22 is formed on top of the counter electrode 23 and patterned. The lyophobic layer 22 of the counter substrate 3 may be identical in material, film thickness, film-forming method, and patterning method to the lyophobic layer 22 of the control substrate 2.

Finally, as shown in (c) of FIG. 3, a reagent inlet 24 is formed in the glass substrate 10, the counter electrode 23, and the lyophobic layer 22. The reagent inlet 24 is a hole through which to inject a reagent and oil that are actually controlled during use of the liquid drop control device 1 and through which to simultaneously vent a gas in a space into which the reagent and the oil are injected. The reagent inlet 24 may be formed through the use of machining such as drilling, wet etching, or various types of glass processing technique such as laser processing. The reagent inlet 24 has a hole diameter of approximately 1 to 5 mm, and it is only necessary to select a size as appropriate according to a method for injecting the reagent and the oil and the amounts of the reagent and the oil that are injected.

Through the foregoing steps, the counter substrate 3 is obtained. Although (c) of FIG. 3 takes an example in which one reagent inlet 24 is formed, a plurality of reagent inlets 24 may be formed.

Then, the method for manufacturing the liquid drop control device 1 is described with reference to (d) of FIG. 3.

First, a seal material 25 is drawn through the use of a dispenser on top of the protective insulating layer 21 from which the lyophobic layer 22 has been removed by patterning over the control substrate 2 shown in (g) of FIG. 2. The seal material 25 is drawn all around the outer edges of cells that will be divided in a subsequent step.

Then, the counter electrode 23 from which the lyophobic layer 22 has been removed by patterning over the counter substrate 3 shown in (c) of FIG. 3 and the seal material 25 are aligned with each other, and the counter electrode 23 and the seal material 25 are bonded together. This causes the lyophobic layers 22 provided in the control substrate 2 and the counter substrate 3, respectively, to face each other.

At this point in time, a cell gap between the control substrate 2 and the counter electrode 3 is secured by mixing plastic beads, glass beads, or other beads into the seal material 25. In consideration of operation of a certain amount of the reagent that has been injected, the particle size of the beads that are mixed into the seal material 25 may range in diameter from 200 to 300 μm for use.

The seal material 25 is cured by performing an annealing process while applying a certain force to the two substrates after having bonded them together. This makes it possible to bond the control substrate 2 and the counter substrate 3 together while securing a uniform cell gap. Since the seal material 25 is placed all around the outer edges of cells, the seal material 25 seals spaces between the control substrate 2 and the counter substrate 3 for each separate cell. At the same time as the drawing of the seal material 25, a conductive paste for use in up-and-down conduction may be applied to the counter substrate 3 to connect the counter electrode 23 to a mounting terminal.

The control substrate 2 and the counter electrode 3 thus bonded together are divided into each cell by dicing or laser processing. For prevention of contamination of the interior of a cell by intrusion of glass cullet, cleaning water, a sublimate, or the like into the cell through the reagent inlet 24 during the dividing process, the dividing process may be performed after the reagent inlet 24 has been closed by a film prior to the dividing process. Through the foregoing steps, the liquid drop control device 1, which is shown in (d) of FIG. 3, is obtained. During actual use of the liquid drop control device 1, the reagent inlet 24 is sealed with the oil and the reagent injected through the reagent inlet 24 into a cell of the liquid drop control device 1.

Figure 4:
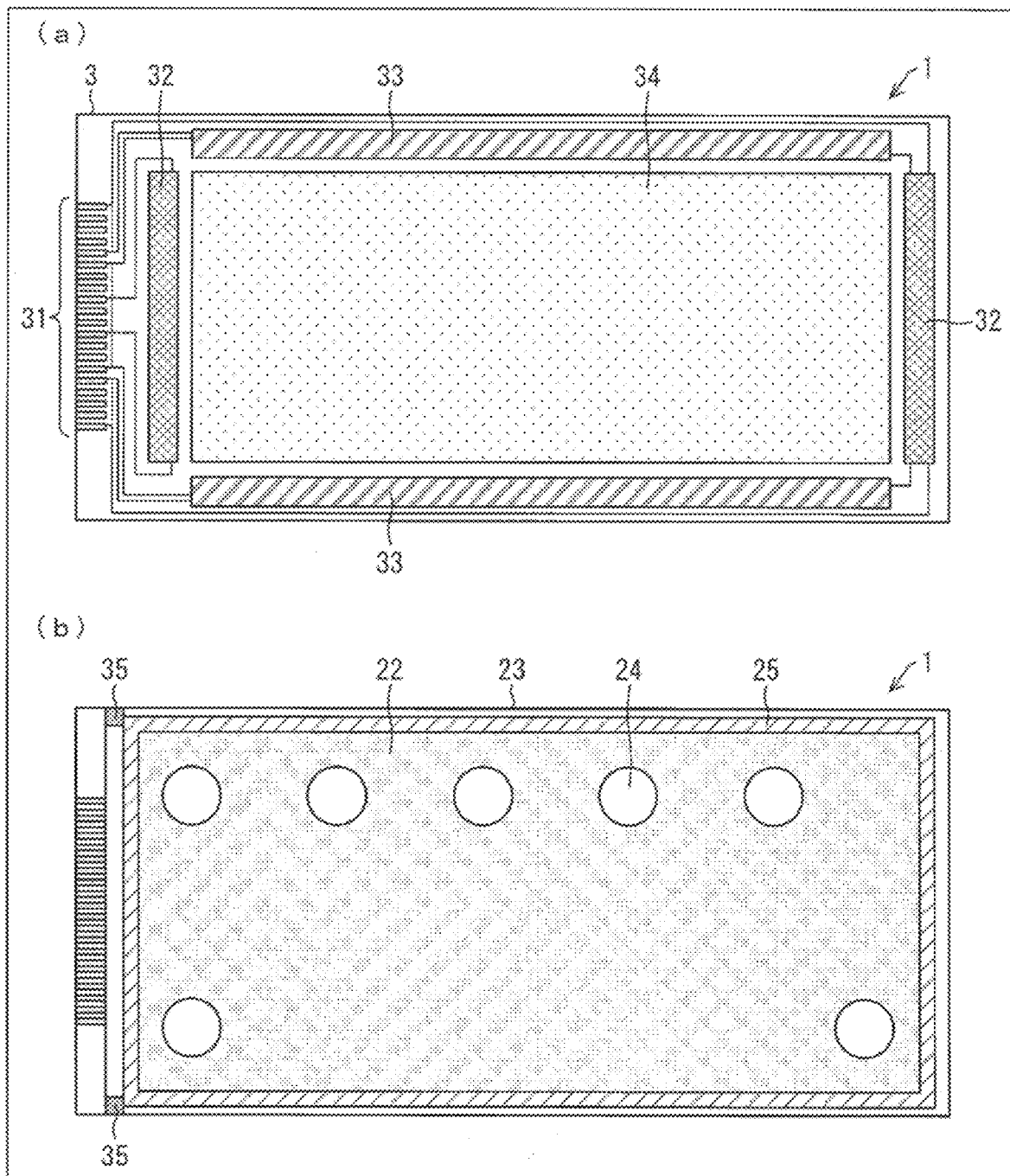
FIG. 4 illustrates top perspective views of the liquid drop control device according to Embodiment 1 of the present invention.

FIG. 4 illustrates top perspective views of the liquid drop control device 1 obtained through the foregoing steps. (a) of FIG. 4 is a top view of the control substrate 2 of the liquid drop control device 1. As shown in (a) of FIG. 4, the control substrate 2 of the liquid drop control device 1 includes a mounting terminal 31, a gate driver 32, a source driver 33, and an active area 34.

(b) of FIG. 4 is a top view of the counter substrate 3 of the liquid drop control device 1. It should be noted that (b) of FIG. 4 is a perspective view of the lyophobic layer 22, the seal material 25, and up-and-down conduction electrodes 35. The lyophobic layers 22 provided in the control substrate 2 and the counter substrate 3, respectively, may be basically identical or may not be identical at all in shape to each other. Further, the diameters, number, and positions of reagent inlets 24 need only be arbitrarily determined by the number of reagents, methods of use, and examples of application during actual use of the liquid drop control device 1.

Figure 1:
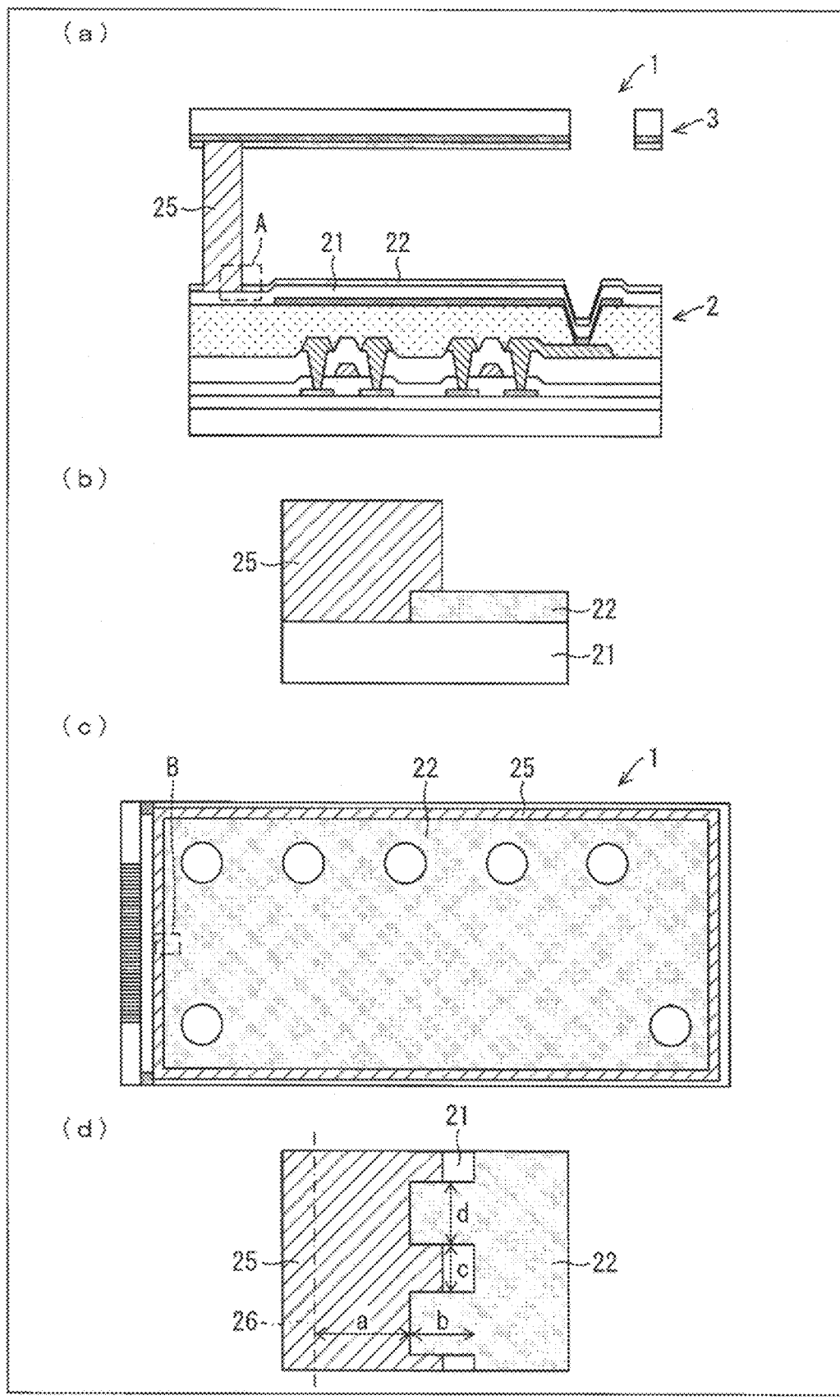
FIG. 1 illustrates diagrams explaining about a structure between a lyophobic layer and a seal material in a liquid drop control device according to Embodiment 1 of the present invention.
Figure 5:
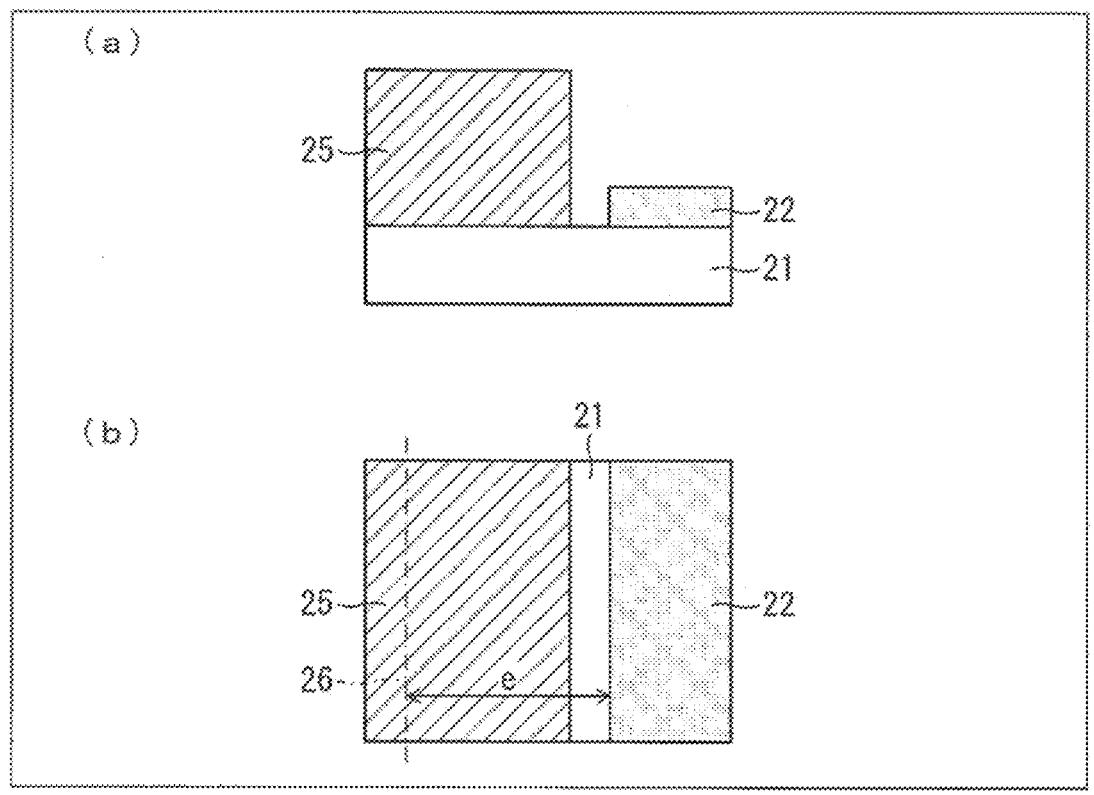
FIG. 5 illustrates diagrams explaining about a structure between a lyophobic layer and a seal material in a liquid drop control device according to a comparative embodiment.

A positional relationship between the lyophobic layers 22 and the seal material 25 is described here with reference to FIGS. 1 and 5.

FIG. 1 illustrates diagrams explaining a positional relationship between an end face of a lyophobic layer 22 of the liquid drop control device 1 according to the present embodiment and a side face of the seal material 25. (b) of FIG. 1 is an enlarged view of the liquid drop control device 1 in an area A of a cross-section f the liquid drop control device 1 shown in (a) of FIG. 1. (d) of FIG. 1 is an enlarged view of the liquid drop control device 1 in an area B of a top view of the liquid drop control device 1 shown in (c) of FIG. 1.

On the other hand, FIG. 5 illustrates diagrams explaining a positional relationship between an end face of a lyophobic layer 22 of a liquid drop control device according to a comparative embodiment and a side face of the seal material 25. It should be noted that the liquid drop control device according to the comparative embodiment may be identical to the liquid drop control device 1 except for the positional relationship between the end face of the lyophobic layer 22 and the side face of the seal material 25 and the shape of the end face of the lyophobic layer 22. Further, (a) of FIG. 5 is an enlarged view of the liquid drop control device according to the comparative embodiment in an area corresponding to the area A shown in (a) of FIG. 1. Similarly, (b) of FIG. 5 is an enlarged view of the liquid drop control device according to the comparative embodiment in an area corresponding to the area 13 shown in (c) of FIG. 1.

First, the positional relationship between the end face of the lyophobic layer 22 of the liquid drop control device according to the comparative embodiment and the side face of the seal material 25 is described with reference to FIG. 5.

As shown in (a) of FIG. 5, the seal material 25 is formed at a gap from the end face of the lyophobic layer 22. For this reason, a gap whose bottom surface is the protective insulating layer 21 is formed between the end face of the lyophobic layer 22 and the side face of the seal material 25. Since the protective insulating layer 21, which serves as the bottom surface, is lyophilic, the gap is similarly lyophilic.

Patterning of the lyophobic layer 22 normally involves the use of photolithography and therefore generally has a patterning accuracy of 10 μm or lower, albeit depending on a device that is used. Meanwhile, since the seal material 25 is applied by drawing using a dispenser, the drawing position of the seal material 25 may shift approximately 0.7 mm from the design.

When the seal material 25 is drawn on top of the lyophobic layer 22 with a displacement in drawing position of the seal material 25, the seal material 25 on top of the lyophobic layer 22 is repelled, with the result that there is a decrease in area of contact of the seal material 25 with the protective insulating layer 21 or the contact between the seal material 25 and the protective insulating layer 21 may be severed. Further, even if the seal material 25 is not completely repelled from the top of the lyophobic layer 22, adhesion between the seal material 25 and the lyophobic layer 22 is poor. For this reason, in a case where a center line of drawing of the seal material 25 as designed is close to the end face of the lyophobic layer 22, the strength of adhesion between the seal material 25 and the control substrate 2 is so weak that a bonding defect may result. For the reason noted above, in order to ensure the strength of adhesion between the seal material 25 and the control substrate 2, it is necessary to secure a certain degree of distance between the center line of drawing of the seal material 25 as designed and the end face of the lyophobic layer 22. In a case where a design is made such that the distance between the seal material 25 and the lyophobic layer 22 is sufficiently large, a gap is uninterruptedly formed for the entire perimeter of the outer edge of the lyophobic layer 22.

Figure 6:
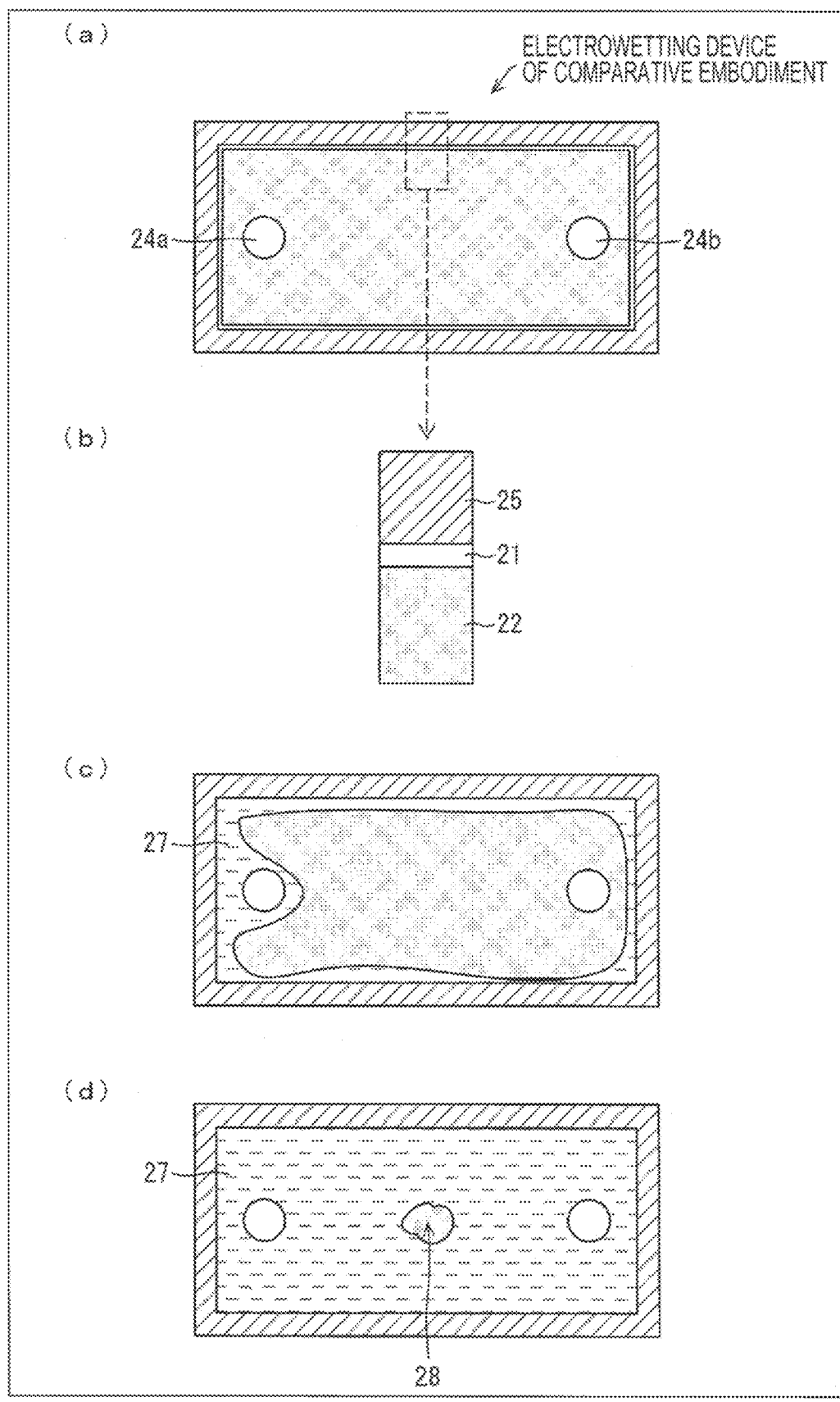
FIG. 6 illustrates diagrams showing how oil is injected into a cell of the liquid drop control device according to the comparative embodiment.

FIG. 6 shows how oil 27 that is used for liquid drop control during actual use is poured into the liquid drop control device of the comparative embodiment provided with an uninterrupted gap. (a) of FIG. 6 is a top view of the liquid drop control device of the comparative embodiment, and (b) of FIG. 6 is a partially-enlarged view of (a) of FIG. 6. (c) of FIG. 6 shows the start of pouring of the oil. 27 into the liquid drop control device of the comparative embodiment, and (d) of FIG. 6 shows the end of pouring of the oil 27 into the liquid drop control device of the comparative embodiment.

In FIG. 6, the counter substrate 3 is provided with a first reagent inlet 24a and a second reagent inlet 24b; however, in actuality, the counter substrate 3 may be provided with more reagent inlets. This example shows how the oil 27 is injected through the first reagent inlet 24a and the oil 27 is injected by venting a gas between the control substrate 2 and the counter substrate 3 through the second reagent inlet 24b.

As shown in (a) and (b) of FIG. 6, a gap is uninterruptedly formed between the entire perimeter of the outer end of the lyophobic layer 22 and the seal material 25. For this reason, at the start of injection of the oil 27 through the first reagent inlet 24a, the oil 27 starts to wet spread along the gap first as shown in (c) of FIG. 6. This is because the gap is more lyophilic than the lyophobic layer 22 as the bottom surface of the gap is formed by the protective insulating layer 21, which is lyophilic. For this reason, the oil 27 may wet spread around the second reagent inlet 24b before the gas between the control substrate 2 and the counter substrate 3 is completely vented through the second reagent inlet 24b.

In this case, a gas near the center of the device is not vented, and as shown in (d) of FIG. 6, a bubble 28 may remain on top of an active area of the cell. The bubble 28, remaining on top of the active area, may pose an impediment to operation of a reagent when the device is used to control the reagent in the cell.

That is, for advantageous improvements in drawability of the seal material 25 and adhesion between the control substrate 2 and the counter substrate 3, it is desirable that a distance e, shown in (b) of FIG. 5, that represents a distance between the end face of the lyophobic layer 22 and the center line of drawing 26 during drawing of the seal material 25 be as great as possible. However, in a case where the distance e is too great, there is a higher possibility that a lyophilic gap may be uninterruptedly formed, with the result that the bubble 28 is easily produced on the active area during injection of the oil. In view of such a trade-off, the distance e is generally designed to be approximately 1 mm. While FIG. 5 involves a discussion about the lyophobic layer 22 of the control substrate 2 and the seal material 25, the same discussion may also apply to the counter substrate 3.

Next, the positional relationship between the end face of the lyophobic layer 22 of the liquid drop control device 1 according to the present embodiment and the side face of the seal material 25 is described with reference to FIG. 1.

As shown in (d) of FIG. 1, the end face of the lyophobic layer 22 of the liquid drop control device according to the present embodiment has a plurality of projections. For this reason, distances between the end face of the lyophobic layer 22 and the side surface of the seal material 25 vary according to position of the end face of the lyophobic layer 22. In the liquid drop control device 1, the seal material 25 is drawn in such a manner that a part of the seal material 25 is applied onto parts of the projections. For this reason, as shown in (b) of FIG. 1, the lyophobic layer 22 is in contact with the seal material 25 by crossing the gap in a position where a projection is located.

(d) of FIG. 1 shows distances a to d that represent the distance between the center line of drawing 26 of the seal material 25 and the tip of a projection, the length of a projection, the distance between one projection and another, and the width of a projection, respectively. In the present embodiment, a and b are designed to be, but are not limited to, 0.5 mm, and c and d are designed to be, but are not limited to, 1 mm.

The structure shown in FIG. 1 causes a part of the seal material 25 to be surely applied onto the protective insulating layer 21, thus ensuring adhesion between the seal material 25 and the control substrate 2. At the same time, since the lyophobic layer 22 crosses the gap between the end face of the lyophobic layer 22 and the side surface of the seal material 25 so that the end face of the lyophobic layer 22 and the seal material 25 make contact with each other, the gap is prevented from being uninterrupted.

Figure 7:
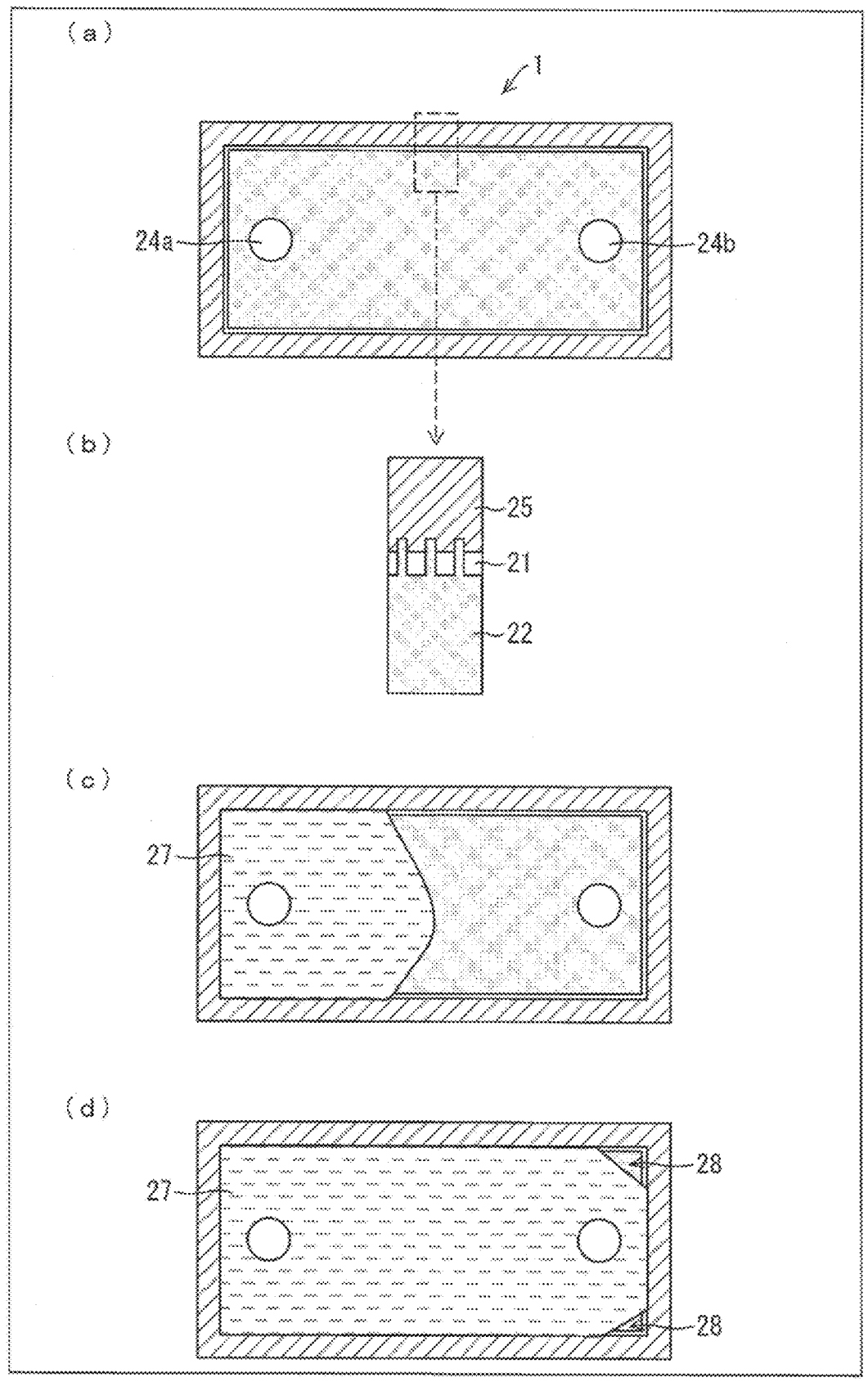
FIG. 7 illustrates diagrams showing how oil is injected into a cell of the liquid drop control device according to Embodiment 1 of the present invention.

FIG. 7 shows how oil 27 that is used for liquid drop control during actual use is poured into the liquid drop control device 1 of the present embodiment provided whose gap has been divided. It should be noted that (a) to (d) of FIG. 7, which correspond to (a) to (d) of FIG. 6, show how the oil 27 is injected into the liquid drop control device 1.

As shown in (a) and (b) of FIG. 7, the gap between the entire perimeter of the outer end of the lyophohic layer 22 and the seal material 25 is divided by projections of the lyophobic layer 22. For this reason, at the start of injection of the oil 27 through the first reagent inlet 24a, the oil 27 does start to wet spread along the gap first but substantially uniformly wet spread as shown in (c) of FIG. 7. This makes it possible to reduce the possibility that the oil 27 may wet spread around the second reagent inlet 24b before the gas between the control substrate 2 and the counter substrate 3 is completely vented through the second reagent inlet 24b.

Accordingly, the foregoing structure makes it possible to vent a gas near the center of the device before the oil 27 wet spreads around the second reagent inlet 24b as shown in (d) of FIG. 7. It should be noted that although there is a possibility that bubbles 28 may remain at corners of the cell as shown in (d) of FIG. 7, there is no problem unless there is a reduction in the possibility that a bubble 28 may remain in such a position as to affect the behavior of the reagent, e.g. on top of the active area.

For the reason noted above, the liquid drop control device 1 according to the present embodiment has a structure in which while adhesion between the control substrate 2 and the seal material 25 is ensured, a bubble 28 hardly remains in the cell during injection of the oil 27. While FIG. 1 involves a discussion about the end face of the lyophobic layer 22 of the control substrate 2, the lyophobic layer 22 of the counter substrate 3 may have the same structure, too. The foregoing structure makes it possible to better control how the oil 27 wet spreads.

Figure 8:
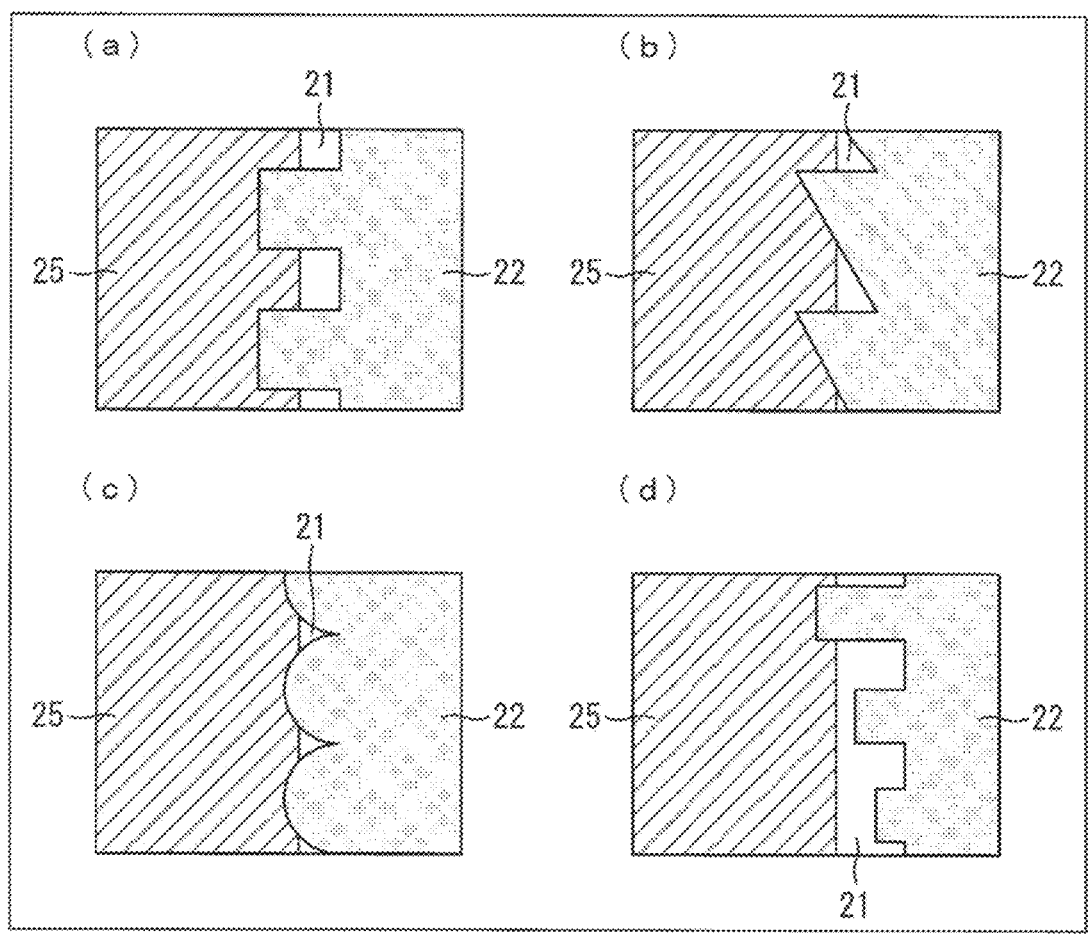
FIG. 8 illustrates diagrams each showing another example of a structure between a lyophobic layer and a seal material in the liquid drop control device according to Embodiment 1 of the present invention.

FIG. 8 illustrates diagrams each showing an example of the shape of the end face of the lyophobic layer 22. Instead of having a projecting shape shown in (a) of FIG. 8, the end face of the lyophobic layer 22 may have a saw-tooth shape shown in (b) of FIG. 8 or a semicircular wave shape shown in (c) FIG. 8. In particular, the shape of each saw tooth of the saw-tooth shape shown in (b) of FIG. 8 may be formed so that the gap becomes larger toward the reagent inlet 24 through which the oil 27 is injected. Since the oil 27 will stay in an area where the lyophilic gap is large, the foregoing configuration makes it possible to better inhibit the oil 27 from wet spreading along the gap.

Furthermore, as shown in (d) of FIG. 8, the end face of the lyophobic layer 22 may include projections the respective shapes of which are different from one another. With the foregoing structure, even if there occurs a displacement in range of application of the seal material 25, a structure in which the gap is divided in at least one place is easily manufactured with a certain degree of adhesion.

The end face of the lyophobic layer 22 may be formed at the seine time as the patterning of the lyophobic layer 22 illustrated with reference to (g) of FIG. 2 and (b) of FIG. 3. Further, the end face of the lyophobic layer 22 may have the aforementioned structures as periodic structures. In this case, at least any one of the periodic structures needs only divide the aforementioned gap.

Embodiment 2

Figure 9:
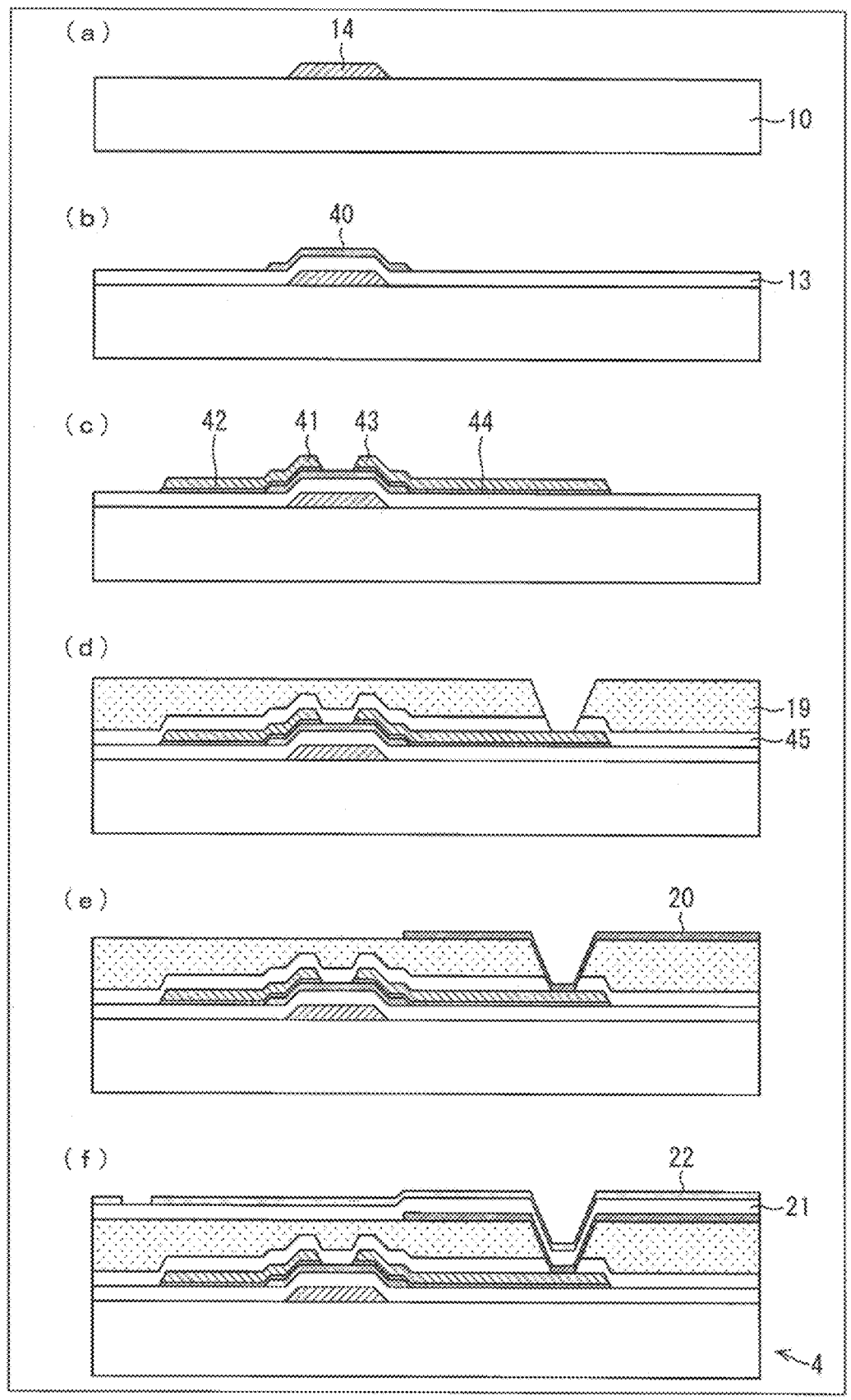
FIG. 9 illustrates step cross sectional views explaining about a method for manufacturing a control substrate of a liquid drop control device according to Embodiment 2 of the present invention.

FIG. 9 illustrates step cross-sectional views for explaining about a method for manufacturing a control substrate 4 of a liquid drop control device according to Embodiment 2. As is the case with the control substrate 2, the control substrate 4 includes a lyophobic layer on top of a TFT substrate including TFTs.

First, as shown in (a) of FIG. 9, a gate electrode 14 is formed on top of a glass substrate 10. The gate electrode 14 may be obtained, for example, by depositing a Cu film with a film thickness of 200 to 500 nm by sputtering and then patterning the Cu film by photolithography, wet etching, and resist removal washing. For adhesion, Ti may be stacked with a film thickness of 30 to 100 nm prior to the formation of the Cu film.

Next, as shown in (b) of FIG. 9, a gate insulating layer 13 and an oxide semiconductor layer 40 are formed. For example, the gate insulating layer 13 may be formed by forming a film of $SiN_x$ with a film thickness of 200 to 500 nm by a CVD method. Instead of being the aforementioned $SiN_x$ single layer, the gate insulating layer 13 may be a laminated structure of $SiO_2/SiN_x$ or a single-layer structure of $SiO_2$. After that, the oxide semiconductor layer 40 may be formed by forming a film of an oxide semiconductor with a film thickness of 30 to 300 nm as a TFT channel by sputtering and patterning the oxide semiconductor by photolithography, wet etching, and resist removal washing. The oxide semiconductor layer 40 may contain in, Ga, Zn, and O.

Then, as shown in (c) of FIG. 9, upper and lower source electrodes 41 and 42 and upper and lower drain electrodes 43 and 44 are formed. In the present embodiment, first, a Ti film is formed with a film thickness of 30 to 100 nm by sputtering as a metal material of the lower source electrode 42 and the lower drain electrode 44. Next, a Cu film is formed with a film thickness of 100 to 400 nm as a metal material of the upper source electrode 41 and the upper drain electrode 43. After that, the Ti film and the Cu film are subjected to photolithography, processed by dry etching and wet etching, respectively, and then subjected to resist removal washing. In this way, the upper and lower source electrodes 41 and 42 and the upper and lower drain electrodes 43 and 44, which include a Cu/Ti laminated layer, may be formed.

Next, as shown in (d) of FIG. 9, a protective layer 45 and an interlayer insulating layer 19 are formed. In the present embodiment, a $SiN_x$ film is formed with a film thickness of 100 to 700 nm by a CVD method as a material of the protective layer 45. After that, a photosensitive organic material is applied as a material of the interlayer insulating layer 19. After that, the protective layer 45 and the interlayer insulating layer 19 are formed by performing patterning by photolithography and dry etching. Instead of being the aforementioned $SiN_x$ single layer, the protective layer 45 may be a laminated structure of $SiO_2/SiN_x$ or a single-layer structure of $SiO_2$.

Finally, as shown in (e) of FIG. 9, an array electrode 20 is formed, and as shown in (f) of FIG. 9, a protective insulating layer 21 and a lyophobic layer 22 are formed. The array electrode 20, the protective insulating layer 21, and the lyophobic layer 22 may be formed by the methods described in the foregoing embodiment. Through the foregoing steps, the control substrate 4 is manufactured. In the present embodiment, too, peripheral circuits such as a gate driver and a source driver of the control substrate 4 may be simultaneously formed at the same time as the foregoing steps.

After that, as in the case of the foregoing embodiment, the liquid drop control device of the present embodiment is manufactured through the manufacture of a counter substrate 3 and the bonding of the control substrate 4 to a counter substrate 3 via a seal material 25. An end face of lyophobic layer 22 and a side surface of the seal material 25 are identical in structure to those described in the foregoing embodiment. For this reason, the liquid drop control device of the present embodiment brings about the same effects as the liquid drop control device 1 of the foregoing embodiment.

Embodiment 3

Figure 10:
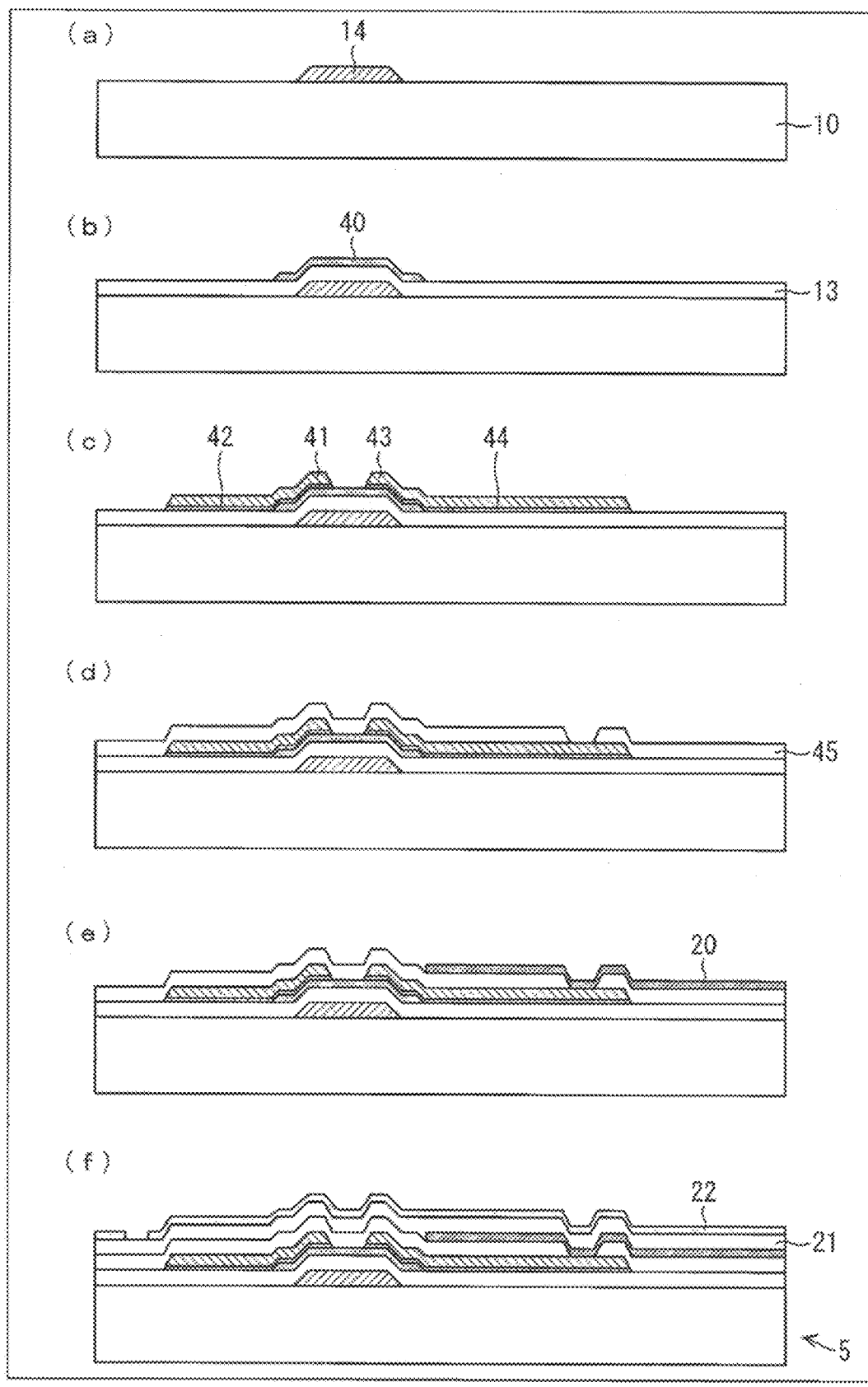
FIG. 10 illustrates step cross-sectional views explaining about a method for manufacturing a control substrate of a liquid drop control device according to Embodiment 3 of the present invention.

FIG. 10 illustrates step cross-sectional views for explaining about a method for manufacturing a control substrate 5 of a liquid drop control device according to Embodiment 3. As is the case with the control substrate 2, the control substrate 5 includes a lyophobic layer on top of a TFT substrate including TFTs.

As shown in (a) to (c) of FIG. 10, the method for manufacturing the control substrate 5 is identical to the method for manufacturing the control substrate 4 up to the formation of upper and lower electrodes 41 and 42 and upper and lower drain electrodes 43 and 44. After that, as shown in (d) of FIG. 10, a protective layer 45 is formed. In the present embodiment, a $SiN_x$ film is formed with a film thickness of 100 to 700 nm by a CVD method as a material of the protective layer 45. After that, the protective layer 45 is formed by performing patterning by photolithography and dry etching. Instead of being the aforementioned $SiN_x$ single layer, the protective layer 45 may be a laminated structure of $SiO_2/SiN_x$ or a single-layer structure of $SiO_2$.

Finally, as shown in (e) of FIG. 10, an array electrode 20 is formed, and as shown in (f) of FIG. 10, a protective insulating layer 21 and a lyophobic layer 22 are formed. The array electrode 20, the protective insulating layer 21, and the lyophobic layer 22 may be formed by the methods described in the foregoing embodiments. Through the foregoing steps, the control substrate 5 is manufactured. In the present embodiment, too, peripheral circuits such as a gate driver and a source driver of the control substrate 5 may be simultaneously formed at the same time as the foregoing steps.

After that, as in the case of the foregoing embodiments, the liquid drop control device of the present embodiment is manufactured through the manufacture of a counter substrate 3 and the bonding of the control substrate 5 to a counter substrate 3 via a seal material 25. An end face of lyophobic layer 22 and a side surface of the seal material 25 are identical in structure to those described in the foregoing embodiments. For this reason, the liquid drop control device of the present embodiment brings about the same effects as the liquid drop control devices of the foregoing embodiments.

Embodiment 4

Figure 11:
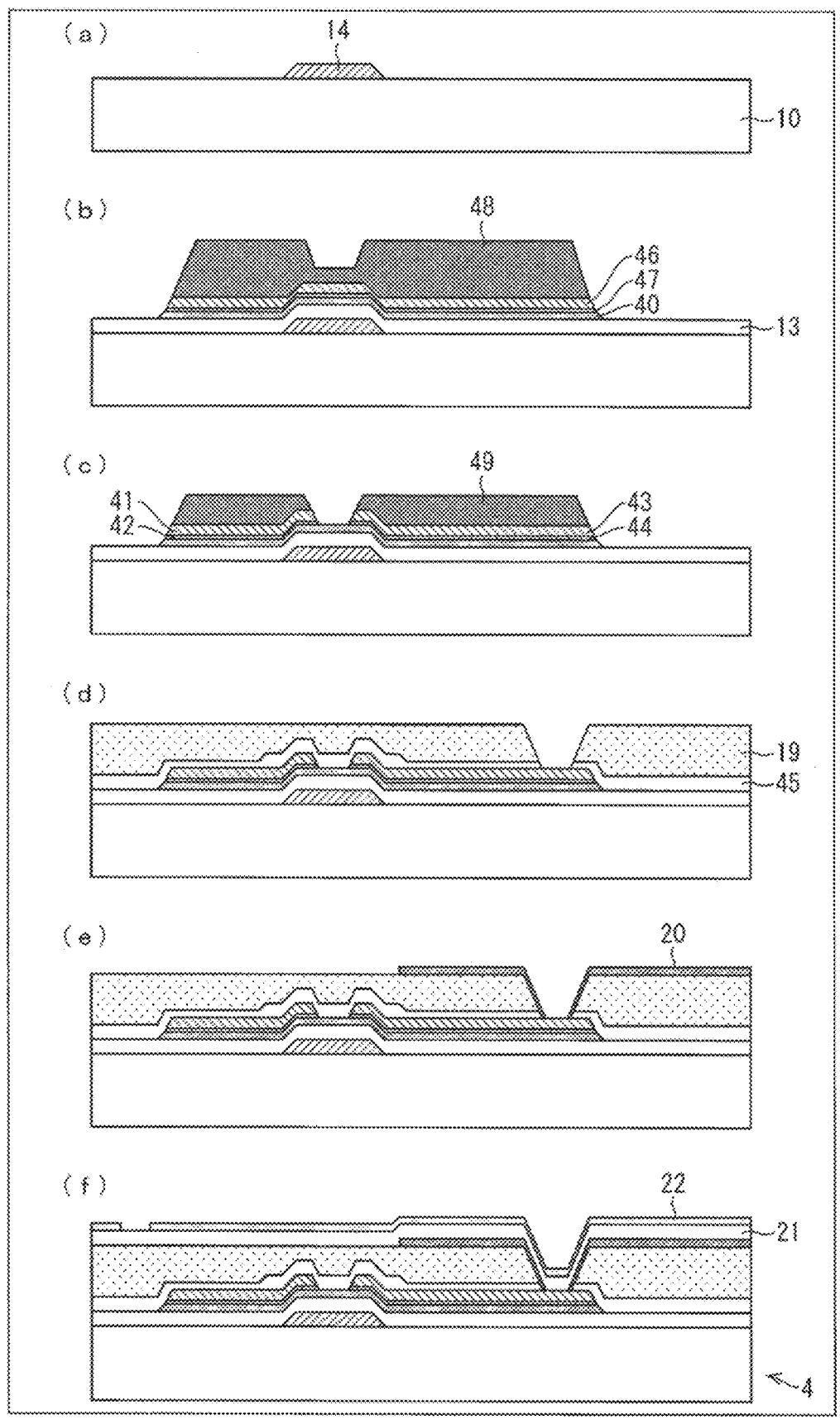
FIG. 11 illustrates step cross-sectional views explaining about a method for manufacturing a control substrate of a liquid drop control device according to Embodiment 4 of the present invention.

FIG. 11 illustrates step cross-sectional views for explaining about a method for manufacturing a control substrate 6 of a liquid drop control device according to Embodiment 4. As is the case with the control substrate 2, the control substrate 6 includes a lyophobic layer on top of a TFT substrate including TFTs.

First, as shown in (a) of FIG. 11, a gate electrode 14 is formed on top of a glass substrate 10. The gate electrode 14 may be formed by the same method as that described in the foregoing embodiments.

Next, a $SiN_x$ layer having a film thickness of 200 to 500 nm is deposited by a CVD method as a material of a gate insulating film 13, and an oxide semiconductor having a film thickness of 30 to 300 nm is deposited by sputtering as a material of an oxide semiconductor layer 40. After that, a Ti film and a Cu film are deposited with a film thickness of 30 to 100 nm and a film thickness of 100 to 400 nm, respectively, to form upper and lower electrode layers 46 and 47. Then, a half resist 48 is formed on top of the upper electrode layer 46 and subjected to photolithography. After that, upper and lower source electrodes 41 and 42 and upper and lower drain electrodes 43 and 44, which include a Cu/Ti laminated layer, are formed by subjecting the upper electrode layer 46 and the lower electrode layer 47 to wet etching and dry etching, respectively. Next, the oxide semiconductor layer 40 is patterned by performing wet etching.

In the present embodiment, as shown in (b) of FIG. 11, the half resist 48 is formed so that a part of the half resist 48 over the gate electrode 14 is thinner in film thickness than the other part of the half resist 48. Therefore, an ashed half resist 49 is obtained by ashing a part of an upper layer of the half resist 48 to remove only the part of the half resist 48 over the gate electrode 14. By subjecting the upper electrode layer 46 and the lower electrode layer 47 to wet etching and dry etching, respectively, from this state, the upper and lower source electrodes 41 and 42 and the upper and lower drain electrodes 43 and 44 are formed as shown in (c) of FIG. 11. After that, the ashed half resist 49 is removed by performing resist removal washing.

Finally, a protective layer 45, an interlayer insulating layer 19, an array electrode 20, a protective insulating layer 21, and a lyophobic layer 22 are formed in sequence. They may be formed by the same method as the method for manufacturing the control substrate 4 of an embodiment described above. Through the foregoing steps, the control substrate 6 is manufactured. In the present embodiment, too, peripheral circuits such as a gate driver and a source driver of the control substrate 6 may be simultaneously formed at the same time as the foregoing steps.

After that, as in the case of the foregoing embodiment, the liquid drop control device of the present embodiment is manufactured through the manufacture of a counter substrate 3 and the bonding of the control substrate 6 to a counter substrate 3 via a seal material 25. An end face of lyophobic layer 22 and a side surface of the seal material 25 are identical in structure to those described in the foregoing embodiments. For this reason, the liquid drop control device of the present embodiment brings about the same effects as the liquid drop control devices of the foregoing embodiments.

Embodiment 5

Figure 12:
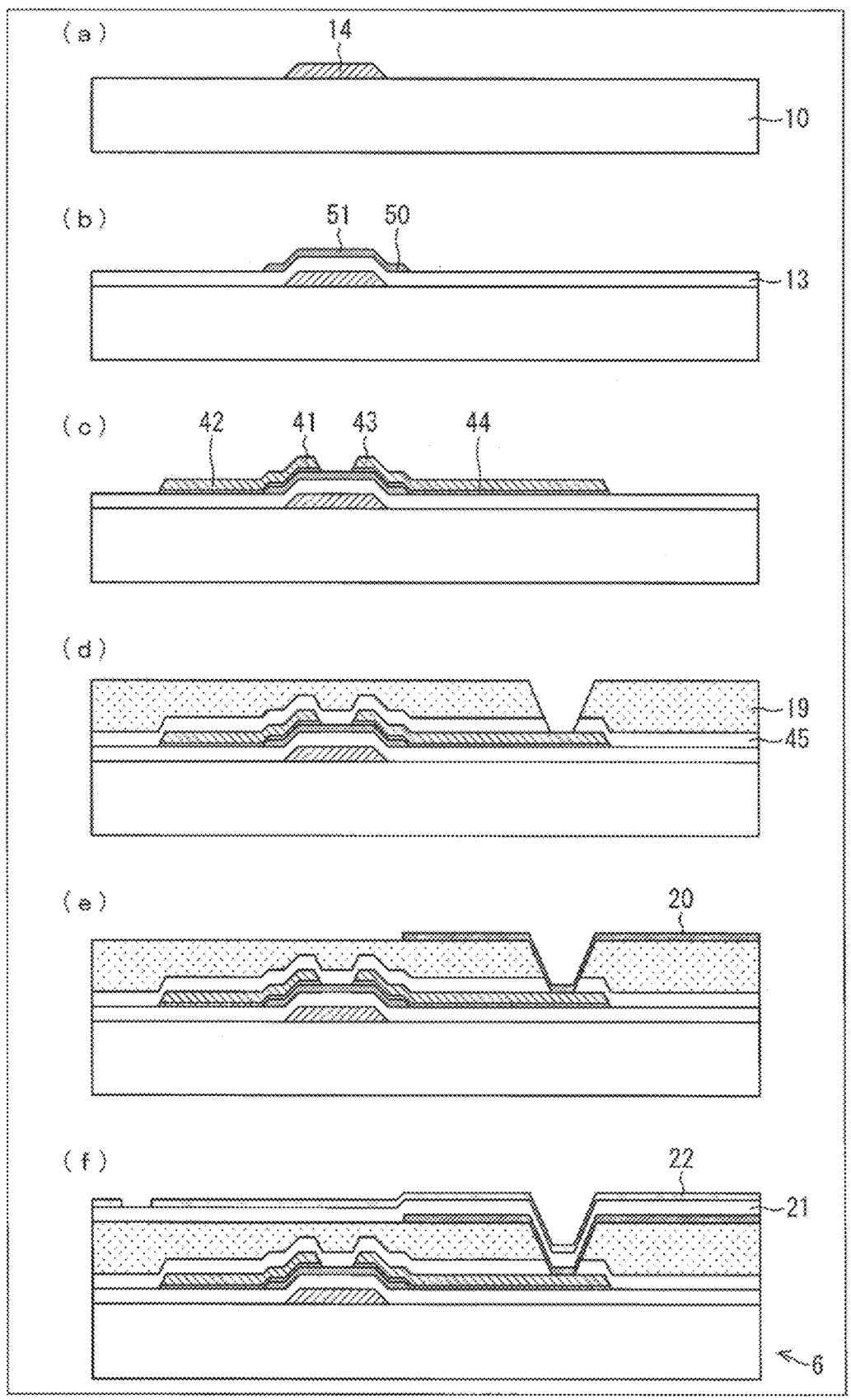
FIG. 12 illustrates step cross-sectional views explaining about a method for manufacturing a control substrate of a liquid drop control device according to Embodiment 5 of the present invention.

FIG. 12 illustrates step cross-sectional views for explaining about a method for manufacturing a control substrate 7 of a liquid drop control device according to Embodiment 5. As is the case with the control substrate 2, the control substrate 7 includes a lyophobic layer on top of a TFT substrate including TFTs.

First, as shown in (a) of FIG. 12, a gate electrode 14 is formed on top of a glass substrate 10. The gate electrode 14 may be formed by the same method as that described in the foregoing embodiments.

Next, as shown in (b) of FIG. 12, a $SiN_x$ layer is formed with a film thickness of 200 to 500 nm by a CVD method as a gate insulating film 13. Then, amorphous silicon having a film thickness of 30 to 300 nm and amorphous silicon having a film thickness of 50 to 150 nm and highly doped with n-type impurities are formed in sequence as a material of an amorphous silicon layer 50 and a material of an electrode contact layer 51, respectively. After that, the amorphous silicon layer 50 and the electrode contact layer 51 are patterned by photolithography, dry etching, and resist removal washing.

After that, as shown in (c) to (f) of FIG. 12, upper and lower source electrodes 41 and 42 and upper and lower drain electrodes 43 and 44, a protective layer 45, an interlayer insulating layer 19, an array electrode 20, a protective insulating layer 21, and a lyophobic layer 22 are formed in sequence. They may be formed by the same method as the method for manufacturing the control substrate 4 or 6 of an embodiment described above. Through the foregoing steps, the control substrate 7 is manufactured. In the present embodiment, too, peripheral circuits such as a gate driver and a source driver of the control substrate 7 may be simultaneously formed at the same time as the foregoing steps.

After that, as in the case of the foregoing embodiments, the liquid drop control device of the present embodiment is manufactured through the manufacture of a counter substrate 3 and the bonding of the control substrate 7 to a counter substrate 3 via a seal material 25. An end face of lyophobic layer 22 and a side surface of the seal material 25 are identical in structure to those described in the foregoing embodiments. For this reason, the liquid drop control device of the present embodiment brings about the same effects as the liquid drop control devices of the foregoing embodiments.

Since the liquid drop control device manufactured in each of the aforementioned embodiments is configured such that the production of bubbles on an active area in a cell is reduced during injection of oil into the cell, an improvement in manufacturing yield of liquid drop control devices are brought about. The liquid drop control device according to each embodiment may be applied to various devices. For example, by using electrodes in the active area 34 as pixel electrodes and controlling them with the gate driver 32 and the source driver 33, which are shown in FIG. 4, the liquid drop control device may be applied to a display device that displays an image by controlling a reagent for each pixel.

CONCLUSION

A method for manufacturing a liquid drop control device of Aspect includes: a substrate manufacturing step of manufacturing two substrates each including a lyophobic layer; and a bonding step of applying a seal material at a gap from an end face of the lyophobic layer of a first one of the substrates, bonding a second one of the substrate and the seal material together so that the lyophobic layers face each other, and sealing a space between the two substrates. In at least one of the substrates, the end face of the lyophobic layer and the seal material make contact with each other in at least one place.

In Aspect 2, the substrate manufacturing step includes forming a lyophilic layer and forming a lyophobic layer on top of the lyophilic layer.

In Aspect 3, the bonding step includes applying the seal material by drawing the seal material on top of the lyophilic layer.

In Aspect 4, the substrate manufacturing step includes patterning the end face of the lyophobic layer of at least one of the substrates.

In Aspect 5, the substrate manufacturing step includes forming a thin-film transistor on one of the substrates.

A liquid drop control device of Aspect 6 is a liquid drop control device including: two substrates whose respective lyophobic layers face each other; and a seal material sealing a space between the two substrates, wherein in at least one of the substrates, the end face of the lyophobic layer and the seal material make contact with each other in at least one place.

In Aspect 7, the gap is lyophilic.

In Aspect 8, the lyophobic layer crosses the gap in a position of contact between the end face of the lyophobic layer and the seal material.

In Aspect 9, distances between the end face of the lyophobic layer and a side surface of the seal material vary according to position of the end face of the lyophobic layer.

In Aspect 10, the end face of the lyophobic layer has at least one projection.

In Aspect 11, the projection includes a plurality of projections at least one of which differs in shape from another one of the projections.

In Aspect 12, the end face of the lyophobic layer has a saw-tooth shape.

In Aspect 13, the end face of the lyophobic layer has a semicircular wave shape.

In Aspect 14, the end face of the lyophobic layer has a periodic structure.

In Aspect 15, the lyophobic layer is amorphous fluororesin.

In Aspect 16, one of the substrates includes a thin-film transistor.

In Aspect 17, the thin-film transistor includes low-temperature polysilicon.

In Aspect 18, the thin-film transistor includes an oxide semiconductor.

In Aspect 19, the thin-film transistor includes amorphous silicon.

A display device of Aspect 20 includes the liquid drop control device.

The present invention is not limited to any of the embodiments described above but may be altered in various ways within the scope of the claims, and an embodiment based on a proper combination of technical means disclosed in different embodiments is encompassed in the technical scope of the present invention. Furthermore, a new technical feature can be formed by a combination of technical means respectively disclosed in embodiments.

REFERENCE SIGNS LIST

1 Liquid drop control device
2, 4, 5, 6, 7 Control substrate
3 Counter substrate
12 Semiconductor layer
21 Protective insulating layer
22 Lyophobic layer
23 Counter electrode
24 Reagent inlet
25 Seal material
26 Center line of drawing of seal material
40 Oxide semiconductor layer
50 Amorphous silicon layer

The invention claimed is:
1. A method for manufacturing a liquid drop control device, the method comprising:
   a substrate manufacturing step of manufacturing two substrates each including a lyophobic layer, the two substrates including a first substrate and a second substrate; and
   a bonding step of applying a seal material at a gap from an end face of the lyophobic layer of the first substrate, bonding the second substrate and the seal material together so that the lyophobic layers face each other, and sealing a space between the two substrates,
   wherein in at least one of the two substrates, the end face of the lyophobic layer and the seal material make contact with each other in at least one place, the end face being an outer edge of the lyophobic layer, and
   the seal material surrounds the lyophobic layer of the first substrates along the end face of the lyophobic layer of the first substrates.

2. The method according to claim 1, wherein the substrate manufacturing step includes forming a lyophilic layer and forming a lyophobic layer on top of the lyophilic layer.

3. The method according to claim 2, the bonding step includes applying the seal material by drawing the seal material on top of the lyophilic layer.

4. The method according to claim 1, wherein the substrate manufacturing step includes patterning the end face of the lyophobic layer of at least one of the two substrates.

5. The method according to claim 1, wherein the substrate manufacturing step includes forming a thin-film transistor on one of the two substrates.

6. A liquid drop control device comprising:
   two substrates whose respective lyophobic layers face each other; and
   a seal material sealing a space between the two substrates, wherein in at least one of the two substrates, a gap is present between an end face of the lyophobic layer and the seal material, the end face being an outer edge of the lyophobic layer, and the lyophobic layer and the seal material make contact with each other in at least one place, and the seal material surrounds the lyophobic layer of the at least one of the two substrates along the end face of the lyophobic layer of the at least one of the two substrates.

7. The liquid drop control device according to claim 6, wherein the gap is lyophilic.

8. The liquid drop control device according to claim 6, wherein the lyophobic layer crosses the gap in a position of contact between the end face of the lyophobic layer and the seal material.

9. The liquid drop control device according to claim 6, wherein distances between the end face of the lyophobic layer and a side surface of the seal material vary according to position of the end face of the lyophobic layer.

10. The liquid drop control device according to claim 9, wherein the end face of the lyophobic layer has at least one projection.

11. The liquid drop control device according to claim 10, wherein the projection comprises a plurality of projections at least one of which differs in shape from another one of the projections.

12. The liquid drop control device according to claim 9, wherein the end face of the lyophobic layer has a saw-tooth shape.

13. The liquid drop control device according to claim 9, wherein the end face of the lyophobic layer has a semicircular wave shape.

14. The liquid drop control device according to claim 9, wherein the end face of the lyophobic layer has a periodic structure.

15. The liquid drop control device according to claim 6, wherein the lyophobic layer is amorphous fluororesin.

16. The liquid drop control device according to claim 6, wherein one of the two substrates includes a thin-film transistor.

17. The liquid drop control device according to claim 16, wherein the thin-film transistor includes low-temperature polysilicon.

18. The liquid drop control device according to claim 16, wherein the thin-film transistor includes an oxide semiconductor.

19. The liquid drop control device according to claim 16, wherein the thin-film transistor includes amorphous silicon.

20. A display device comprising the liquid drop control device according to claim 6.

21. The method according to claim 1, wherein the seal material partially overlaps a part of the end face of the lyophobic layer of the first one of the two substrates in a plan view.

22. The method according to claim 6, wherein the seal material partially overlaps a part of the end face of the lyophobic layer of the at least one of the two substrates in a plan view.

23. The liquid drop control device according to claim 12, wherein
a reagent inlet is provided through the at least one of the two substrates and the lyophobic layer, and
in the saw-tooth shape, the gap becomes larger toward the reagent inlet.

* * * * *